US007410142B2

(12) United States Patent
Kurtz et al.

(10) Patent No.: US 7,410,142 B2
(45) Date of Patent: Aug. 12, 2008

(54) HOOD PROP WITH SUPPORT

(75) Inventors: Scotty R. Kurtz, Clarinda, IA (US); Al R. Rohrbach, Pierre, SD (US)

(73) Assignee: Lisle Corporation, Clarinda, IA (US)

(*) Notice: Subject to any disclaimer, the term of this patent is extended or adjusted under 35 U.S.C. 154(b) by 356 days.

(21) Appl. No.: 11/358,765

(22) Filed: Feb. 21, 2006

(65) Prior Publication Data

US 2007/0194199 A1 Aug. 23, 2007

(51) Int. Cl.

| | |
|---|---|
| ***F16M 13/00*** | (2006.01) |
| ***A47F 5/00*** | (2006.01) |
| ***E04G 25/00*** | (2006.01) |
| ***E05C 17/54*** | (2006.01) |

(52) U.S. Cl. .................... 248/357; 248/352; 248/354.1; 292/338; 292/339

(58) Field of Classification Search ................ 292/338, 292/339; 248/352, 354.1, 357
See application file for complete search history.

(56) References Cited

U.S. PATENT DOCUMENTS 2,051,969 A 8/1936 Shastock
2,434,598 A * 1/1948 Stegall ....................... 292/339
2,671,355 A 3/1954 Hawkins
3,480,247 A 11/1969 Waner
3,615,114 A 10/1971 Harris
3,711,892 A 1/1973 Tabor
5,238,213 A * 8/1993 Pool ........................... 248/352
5,411,109 A * 5/1995 Orns ......................... 180/69.2
2002/0109055 A1 * 8/2002 Davis ...................... 248/188.5

OTHER PUBLICATIONS

Mac Tool "Hood Holder" , Model HH387, shown in catalogue, p. 345.

* cited by examiner

Primary Examiner—Christopher Ellis
Assistant Examiner—John R Olszewski
(74) *Attorney, Agent, or Firm*—Banner & Witcoff, Ltd.

(57) ABSTRACT

An adapter for a hood prop includes oppositely extending counterbores in a cylindrical housing separated by a transaxial wall. The adapter is designed to be fitted over a hood stop and to receive the end of a telescoping hood prop.

7 Claims, 4 Drawing Sheets

HOOD PROP WITH SUPPORT

BACKGROUND OF THE INVENTION

In a principal aspect the present invention relates to a support adapter used in combination with a telescopic hood prop device for maintaining the hood of a motor vehicle in an elevated and supported position.

In U.S. Pat. No. 5,238,213, entitled "Hood Prop Device", incorporated herewith by reference, a telescoping prop used by auto mechanics to support the open hood of a motor vehicle is disclosed. The device is inserted between the underside of a hood, that is attached pivotally to the body of a motor vehicle, and the engine compartment. The telescoping prop thus can be adjusted to accommodate the angle and size of a particular hood that is to be maintained in an open or elevated position. Typically, the hood prop includes rubber or polymeric end caps on the opposite ends of the telescoping prop device. The end caps are designed to frictionally engage the engine compartment at one end and the hood underside at the opposite end in a manner which will preclude slippage of the hood prop when it supports an open hood. There are occasions, however, when such an arrangement is not practical or available or adequately functional. In such instances, it may be necessary, for example, to affix the ends of the hood prop to the vehicle body and the underside of the hood by means of a clamp or some other type of tying device.

Thus, there has developed over time a need to insure accurate positioning and holding of a hood prop in an appropriate position within the engine compartment of a motor vehicle so as to support the hood in an open position.

SUMMARY OF THE INVENTION

Briefly, the present invention comprises a hood prop support adapter which in combination with a hood prop is useful for maintaining the lower end of the hood prop positioned and engaged securely with the interior of the engine compartment of a motor vehicle. In this regard, the device or adapter of the invention utilizes the projecting hood stop associated with the engine compartment of most motor vehicles. That is, typically a motor vehicle will include a projecting stop or hood support within the engine compartment. The top of the stop or support typically includes a rubber grommet or rubber pad. Then when the hood is lowered to the closed position, the stop will engage the hood and maintain the hood in a fixed position which will not vibrate and will insure that the hood remains in the locked or closed position by placing a biasing force against the hood locking mechanism so as to retain the hood in a closed position until the hood lock is released.

The present invention utilizes this hood stop support element which is included with most motor vehicles. More specifically, an adapter is comprised of a generally cylindrical shaped molded plastic or elastomeric element having opposed counterbores axially aligned with one another and separated by a transaxial wall with passages. The opposed counterbores are designed to receive, respectively, the hood stop of the vehicle and the end of a hood prop. The counterbore adapted to receive the hood stop may include a series of transaxial grooves to facilitate placement and retention of the adapter on the hood stop. The opposite end counterbore, adapted to receive the end of the hood prop, is configured to receive the shaped elastomeric cap of the hood prop. An opening in the transaxial wall between the counterbores insures that air trapped in and underneath the cap of the hood prop may exit and thereby insures that the end cap of the hood prop will be completely engaged into the adapter of the invention. Axial ridges or ribs on the outside of the adapter enable gripping and movement of the adapter to facilitate its positioning during use.

Thus, it is an object of the invention to provide a hood prop support adapter useful, particularly in combination with a telescoping hood prop.

It is a further object of the invention to provide a hood prop adapter which may be used in combination with pre-existing hood prop devices as well as the internal construction including a hood support pad associated with typical motor vehicles.

Another object of the invention is to provide a hood prop support adapter which is inexpensive, rugged and useful in combination with pre-existing types of hood prop devices.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
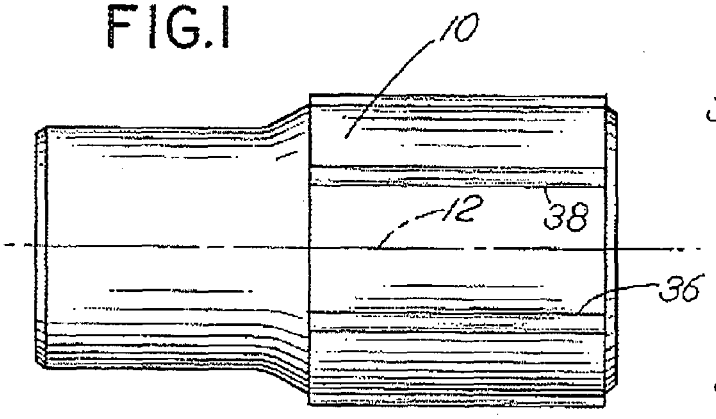
FIG. 1 is a side elevation of the adapter of the invention.
Figure 2:
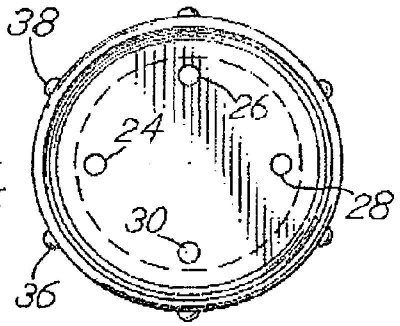
FIG. 2 is an end view of the adapter of FIG. 1 as viewed from the right-hand side thereof.
Figure 3:
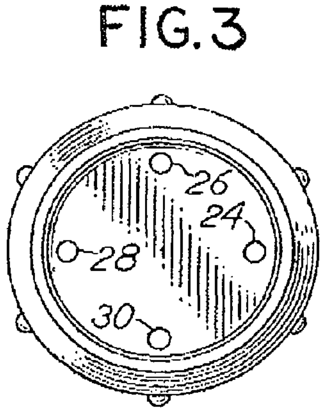
FIG. 3 is a left-hand side elevation or end view of the adapter of FIG. 1.
Figure 4:
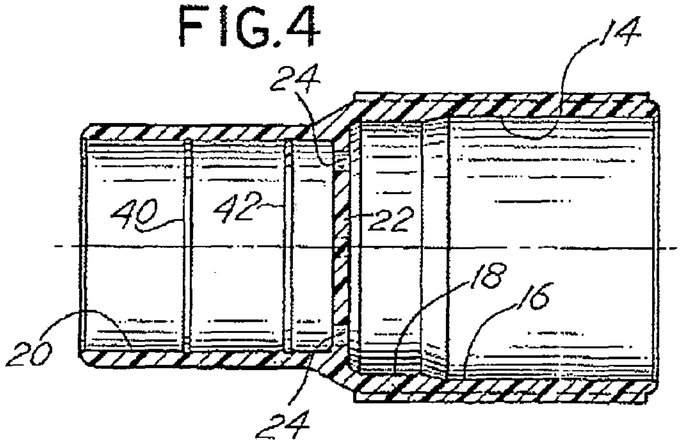
FIG. 4 is a side cross sectional view of the adapter of FIG. 2 taken along the line 4-4.
Figure 6:
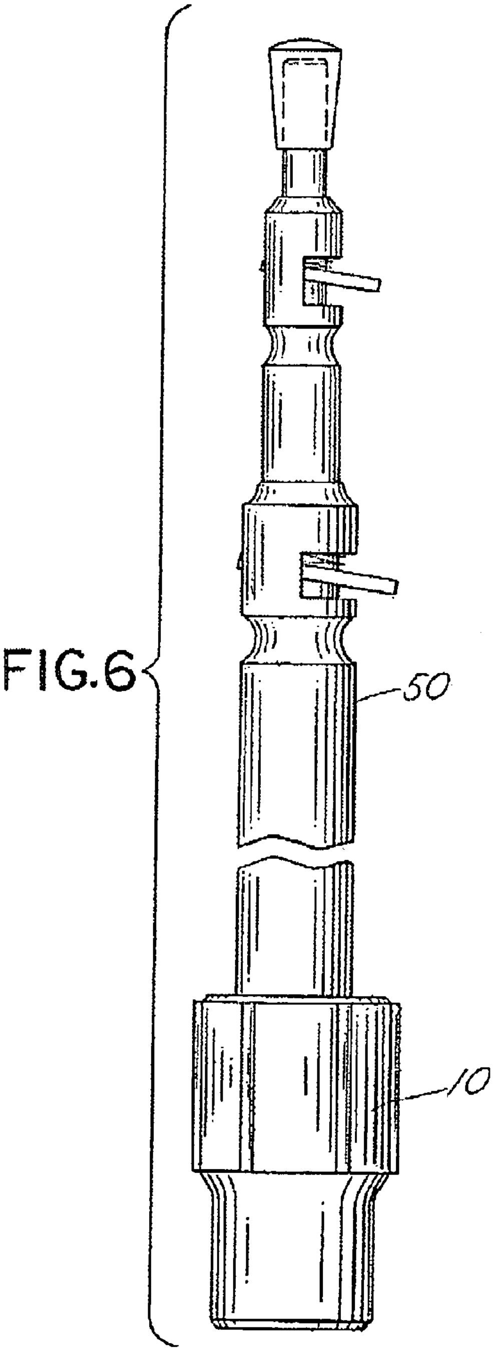
FIG. 6 is a side elevation of a combination of the hood prop adapter of the invention with a typical hood prop of the type referenced in the Background of the Invention.
Figure 5:
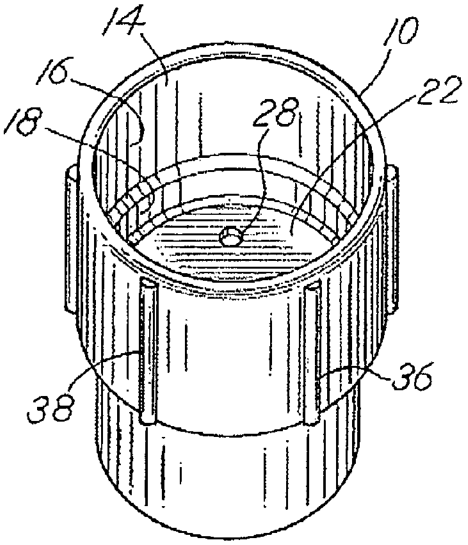
FIG. 5 is an isometric view of the hood prop adapter of FIG. 1.

FIGS. 1-5 illustrates an adapter 10 of the invention. The remaining figures illustrate the adapter 10 in combination with a typical hood prop 50 support device.

Referring to FIGS. 1-5 the adapter 10 is comprised of a molded plastic or elastomeric material, for example, a polypropylene plastic material. The adapter 10 is generally cylindrical and symmetric about a longitudinal axis 12. The adapter 10 is comprised of a first axial counterbore 14 having a first, uniform diameter section 16 and a second, uniform diameter adjoining section 18 of lesser diameter than the diameter of the first section 16. The adapter 10 further includes a second, uniform diameter counterbore 20 having a diameter which is less than the diameter of the second section 18 of the first counterbore 14. The junction 19 of section 18 to section 16 forms a transition which cushions the insertion of the end of a hood prop device inserted into the counterbore 14. The counterbores 14 and 20 are separated by transaxial wall 22 which is spaced radially from the axis 12 adjacent the lateral side of counterbore 20. The opening 24 permits air flow through the transaxial wall 22. Because the hood stop 60 is likely to be crowned, as is the end cap of a hood prop, the opening 24 is positioned adjacent the lateral side wall of counterbore 20 so that the opening will not be blocked and thus the hood stop 60 and end of a hood prop will fully extend into the adapter counterbores. Multiple openings 24, 26 maybe employed.

The external wall 31 associated with and defining counterbore 14 is comprised of a series of axially aligned ribs such as ribs 36 and 38. In the preferred embodiment six equally spaced ribs are provided as depicted, for example, in FIG. 2. The ribs 36, 38 extend entirely along the outside surface of wall 31.

Another optional feature of the invention is the inclusion of optional transaxial grooves, such as grooves 40 and 42 within the second counterbore 20. Approximately 2 to 4 such transaxial grooves are preferred.

Figure 7:
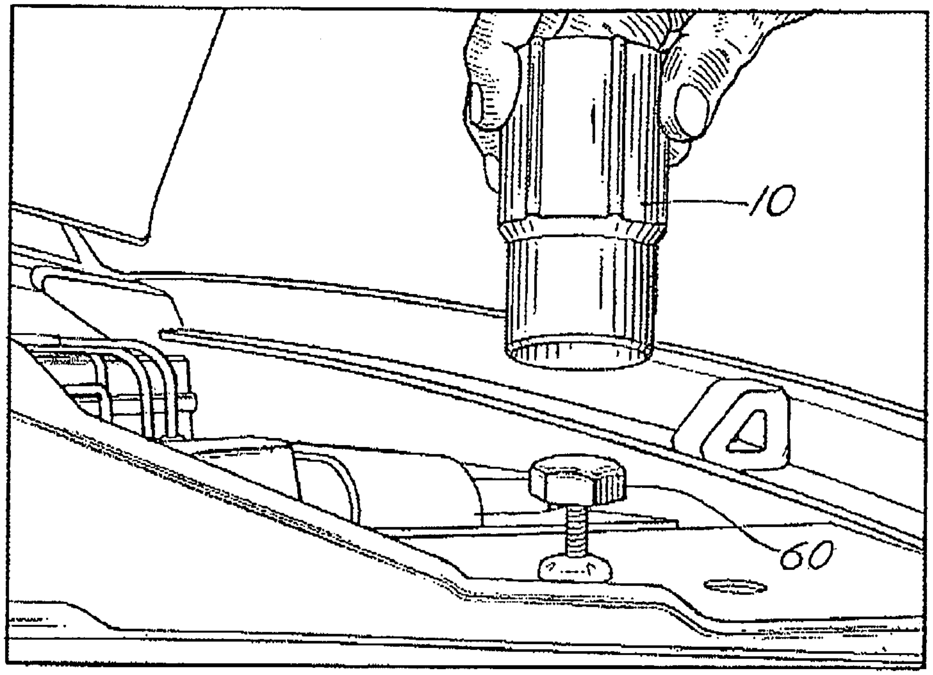
FIG. 7 is an isometric view depicting the manner of placement of the adapter of the invention within the engine compartment of a typical motor vehicle and over the hood support device within that engine compartment.

FIGS. 6-9 illustrate the use of the adapter. The adapter 10 is combined with a hood prop 50 which is a telescoping hood prop device 50 typically of the type shown in U.S. Pat. No. 5,238,213. In use as shown in FIG. 7 the hood prop 10, and more particularly the second counterbore 20 thereof, may be fitted over a hood stop 60 in the engine compartment of a vehicle. The optional grooves 40 and 42, previously described, facilitate gripping and maintaining the adapter 10 on the hood stop 60. The opening 24 insures that the hood stop 60 and prop 50 fit fully into the adapter.

Figure 8:
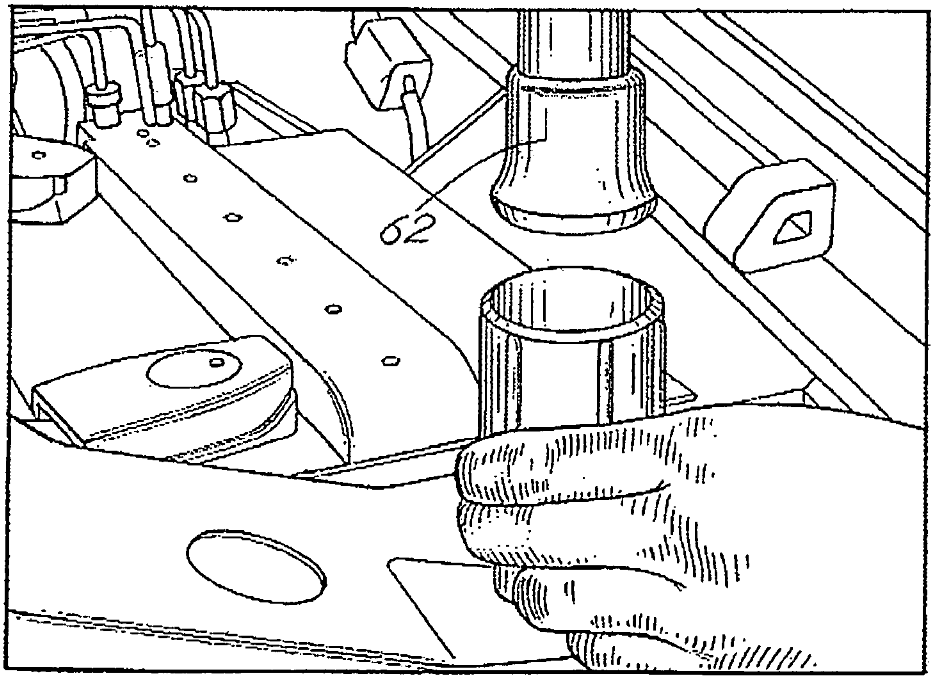
FIG. 8 illustrates the placement of a hood prop in the adapter of the invention.

Subsequently, as shown in FIG. 8, the hood prop 10, and more particularly the end cap thereof, may be inserted into the first counterbore 14 as depicted in FIG. 8. The opening 24 insures that the air within the first counterbore 14 will flow out of that counterbore 14 and permit the cap 62 to be fully inserted.

Figure 9:
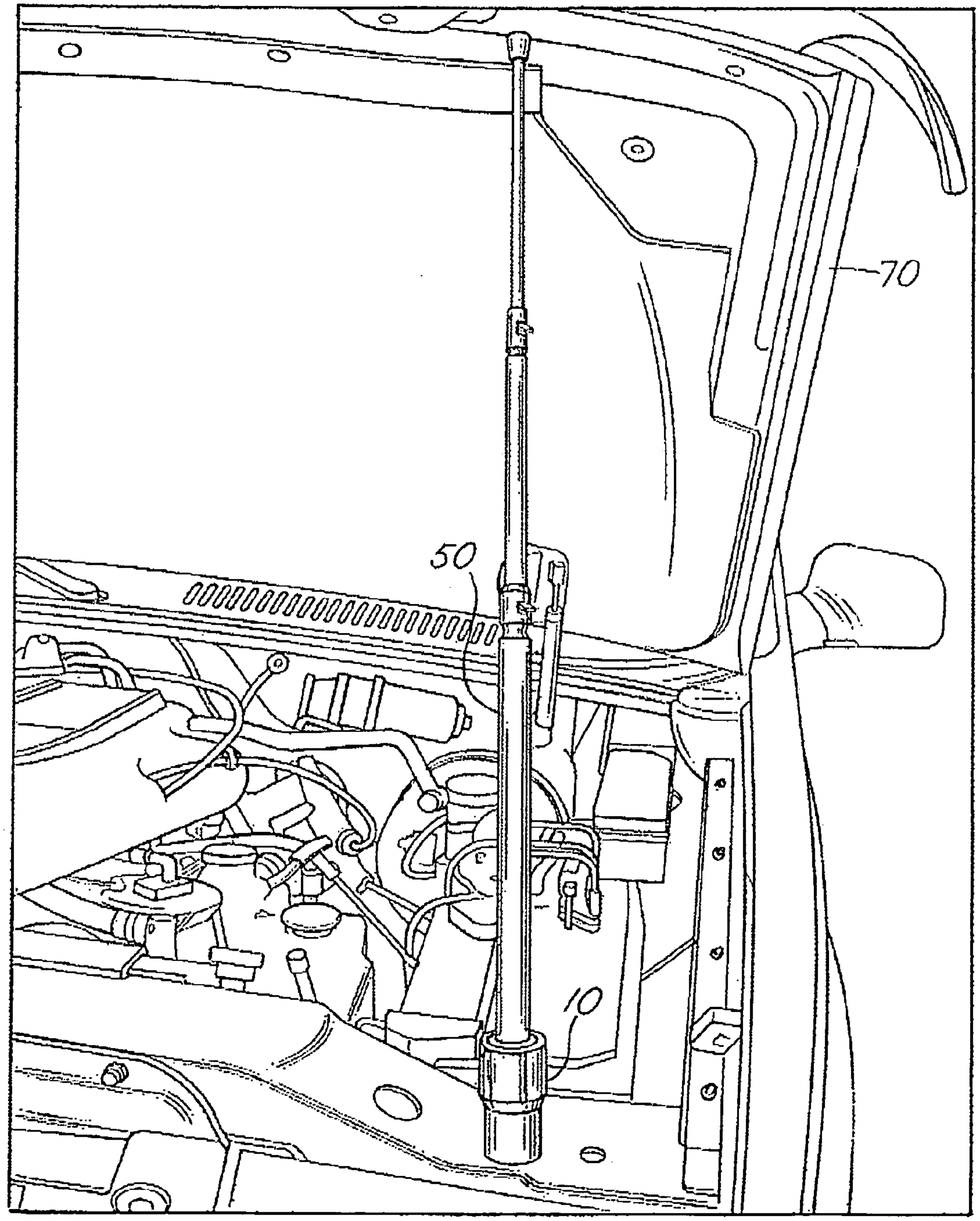
FIG. 9 depicts the adapter in combination with a hood prop supporting a hood in an open position.

Then, as shown in FIG. 9, the hood prop 50 will be supportive of a hood 70. The hood prop 50 will extend upwardly from the adapter 10 to the hood 70 and be maintained in a generally fixed and rigidly supported position which insures the mechanic utilizing the device that the hood 70 will remain elevated as desired. Variations of the invention are possible without departing from the spirit and scope thereof. Thus, the invention is only limited by the following claims and equivalents thereof.

What is claimed is:

1. A hood prop support adapter comprising, in combination:

a molded plastic cylinder having an outside surface, a centerline axis, a first hood prop receiving end and a second vehicle hood stop end, a first axial counterbore extending from the first receiving end comprising a generally uniform diameter first section connected by a transition section to a lesser, uniform diameter second section;

a transverse internal wall abutting the uniform diameter second section;

a second generally uniform diameter, coaxial counterbore extending from the second hood stop end, said second counterbore having an internal wall with a diameter lesser than the diameter of said second section of said first counterbore, said second counterbore abutting the said transverse internal wall from a side of said wall opposite the first counterbore; and at least one opening through the transverse internal wall radially spaced from the center line axis and adjacent the second counterbore internal wall.

2. The adapter of claim 1 wherein the second counterbore includes at least one circumferential groove transverse to the axis within the second counterbore.

3. The adapter of claim 1 including a plurality of axially aligned ribs along the outside surface of the external wall of the first counterbore end of the cylinder.

4. The adapter of claim 3 wherein the ribs comprise six uniformly spaced ribs.

5. The adapter of claim 1 including a plurality of spaced openings through the internal wall radially equidistant from the centerline axis.

6. The adapter of claim 2 wherein the second counterbore includes more than one of said circumferential grooves.

7. The adapter of claim 1 in combination with an extensible hood prop having a hood engaging end and a vehicle body engaging end fitted into the first counterbore.

* * * * *